March 23, 1926.

W. G. KIRCHHOFF 1,577,469

TRAY LOADING MECHANISM

Filed May 20, 1924

Inventor
WILLIAM G. KIRCHHOFF,

By Murray and Gugelter

Attorneys

March 23, 1926.    W. G. KIRCHHOFF    1,577,469
TRAY LOADING MECHANISM
Filed May 20, 1924    4 Sheets-Sheet 4
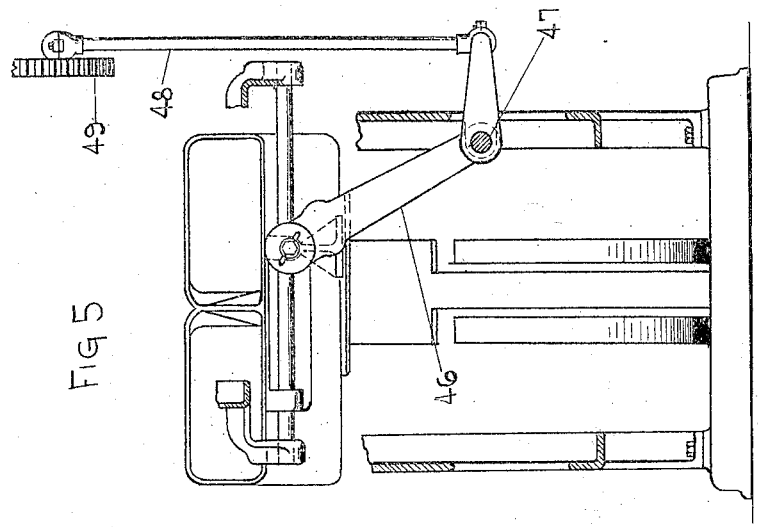
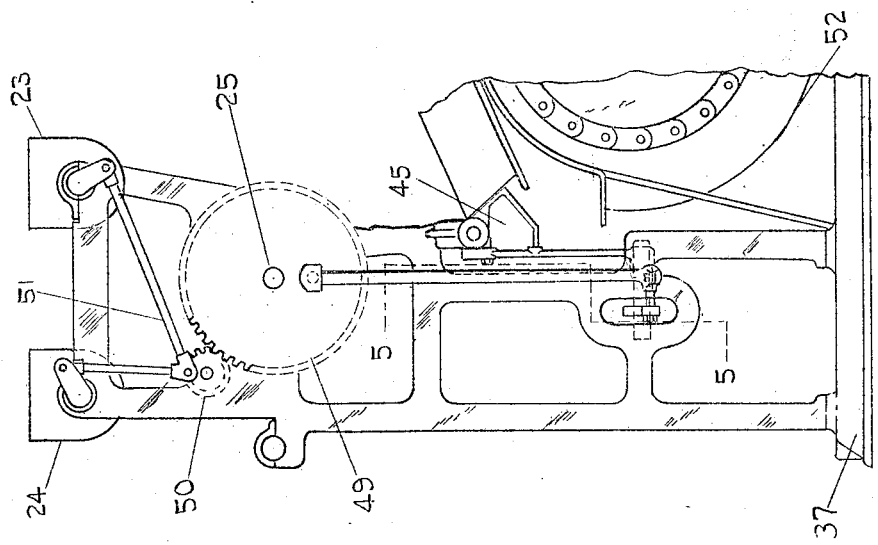
Inventor
WILLIAM G. KIRCHHOFF,
By Murray and Gugelter
Attorneys Patented Mar. 23, 1926.

1,577,469

UNITED STATES PATENT OFFICE.

WILLIAM G. KIRCHHOFF, OF CINCINNATI, OHIO, ASSIGNOR TO THE J. H. DAY COMPANY, OF CINCINNATI, OHIO, A CORPORATION OF OHIO.

TRAY-LOADING MECHANISM.

Original application filed April 26, 1923, Serial No. 634,897. Divided and this application filed May 20, 1924. Serial No. 714,693.

*To all whom it may concern:*

Be it known that I, WILLIAM G. KIRCHHOFF, a citizen of the United States of America, and a resident of Cincinnati, in the county of Hamilton and State of Ohio, have invented a new and useful Improvement in a Tray-Loading Mechanism, of which the following is a specification.

This invention relates to distributing or feed mechanisms as are adapted to supply lumps of dough to trays which carry the dough through a proofing machine.

An object of my invention is to provide a device of this character which is simple and efficient of operation.

Another object of my invention is to provide means for expeditiously distributing individual lumps of dough to individual trays, preparatory to the proofing thereof.

These and other objects are attained by the means described herein, and disclosed in the accompanying drawings, in which:

Fig. 4 is a side elevation showing the opposite side of the device shown in Fig. 2.

Fig. 5 is an enlarged sectional view on line 5—5 of Fig. 4.

Figure 1:
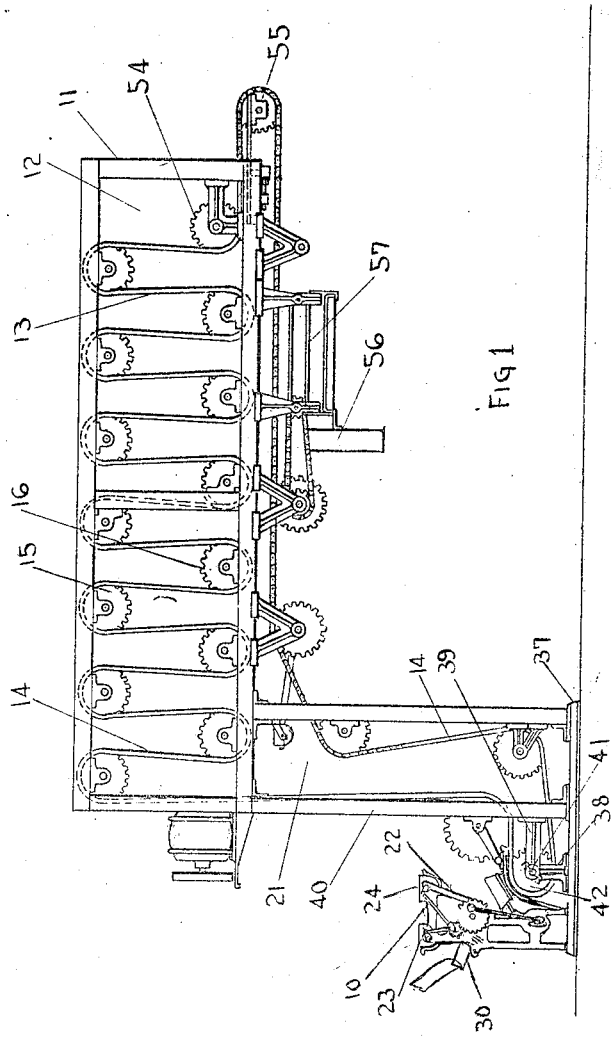
Fig. 1 is a side elevation of a proofing device embodying my invention.

The loading or feeding device of my invention indicated generally as 10, is shown in Fig. 1, in operative connection with a dough proofing machine, such as is set forth in my co-pending application, Serial Number 634,897, filed April 26th, 1923, and of which this is a divisional application.

The proofing device which is shown in Fig. 1 is operatively connected with the loading device 10, and comprises a suitable casing 11, suspended from a ceiling or supported above a floor in any suitable manner, and has formed therein a chamber 12, through which a tray conveyor 13 may carry trays. The conveyor 13 comprises an endless chain 14 extending about sprockets 15 and 16, suitably mounted at the top and bottom of the casing 11. Within the proofing chamber, the chain moves in substantially vertical directions between the sprockets 15 and 16. The chain 14, and the sprockets 15 and 16 are disposed substantially midway of the sides of the casing, and trays 17 extend from opposite sides of the chain in staggered relation. The trays are mounted on stub shafts, which extend outwardly at considerable distance on opposite sides of the chain 14 and form bearings upon which the trays 17 are pivotally or rotatably mounted. The stub shafts serve as alternate pins for connecting the links of the chain 14. The end of each tray adjacent the chain 14 carries lugs 18 and 19 which are disposed adjacent the upper edge or mouth of the tray at the outer edges thereof, and a lug 20 disposed at approximately the center and lowermost portion of the tray and in substantial vertical alignment with the stub shaft upon which the tray is mounted. The lugs 18 and 19 are in substantial horizontal alignment with one another, and with the stub shaft when the tray is in its normal position, at which time the lugs 20 of the trays are in substantial vertical alignment with the stub shafts. The trays are suspended from the stub shafts so that the center of gravity of the trays will serve to move the trays into and normally retain said trays in a normal upright position.

Figure 2:
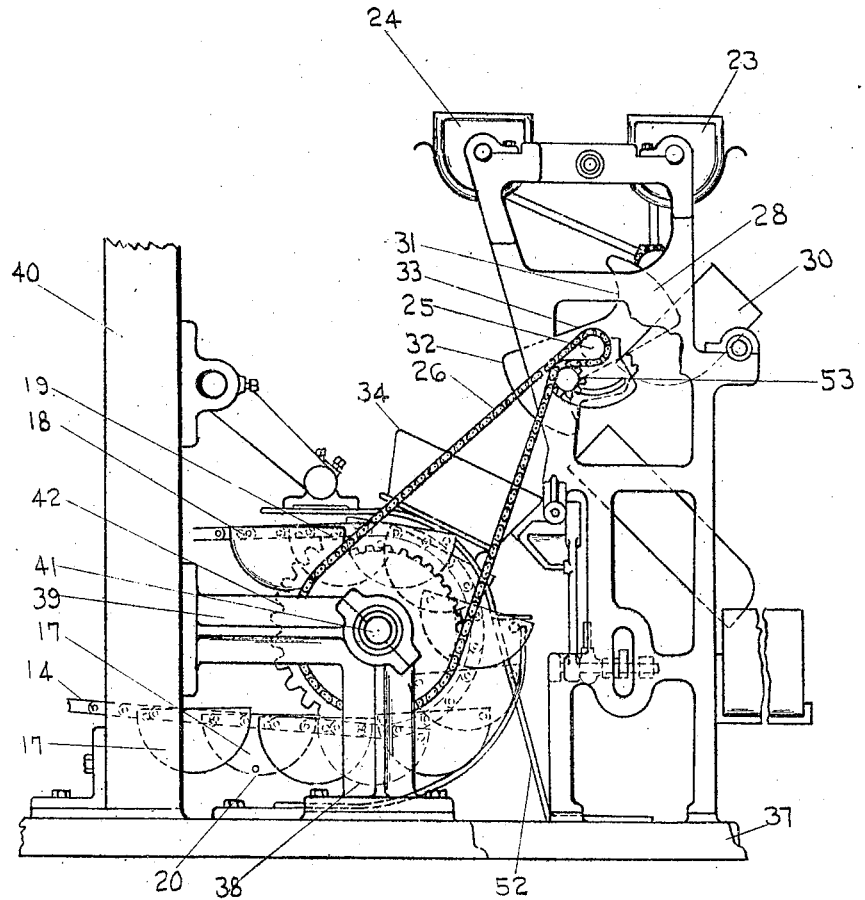
Fig. 2 is a side elevation of a tray loading device embodying my invention.
Figure 3:
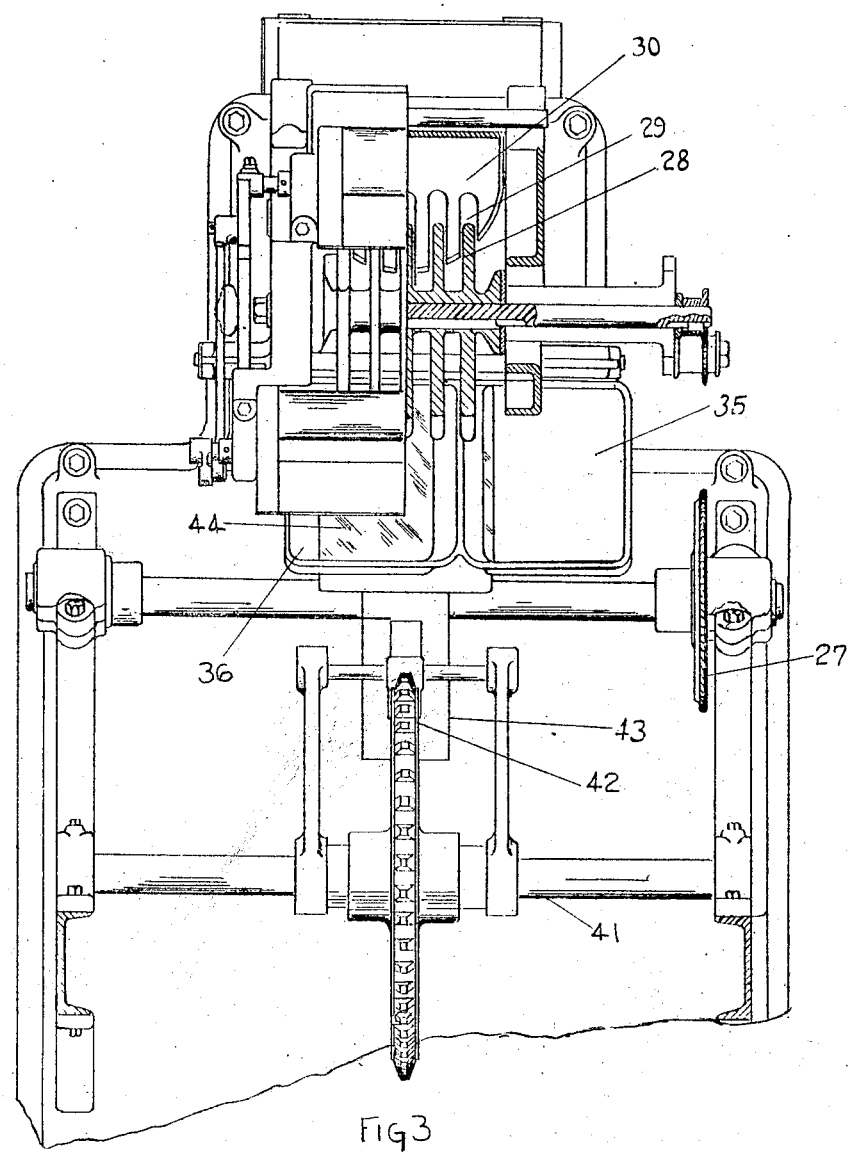
Fig. 3 is a plan view of the device shown in Fig. 2, parts being shown in section.

At the forward end of the casing 11, there is provided a depending auxiliary casing having formed within it a chamber 21 communicating at its top with the chamber 12, and through which the conveyor moves to and from the loading device 10. The tray loading device 10 comprises a frame 22 carrying at its top, flouring devices 23 and 24, and supporting below such flouring devices a revoluble shaft 25, driven by means of a suitable chain 26 from a suitable sprocket 27. The shaft 25 carries fingers 28 for moving through slots 29 formed in the lower portion of a holder 30, into which lumps of dough are discharged from any suitable source, such as a baller. The fingers 28 are curved at one end, whereby a pocket like form is given to the opposite side of the fingers, each pocket being curved at its base, as shown at 31, and extending outwardly to the end 32 of such fingers, or a substantially straight line 33, whereby when the fingers are revolved in a counter-clockwise direction, see Fig. 2, lumps of dough will be received by the fingers from the holder 30 and will slide over the face 33 of such fingers, under the influence of gravity, into a reciprocating cup 34 disposed to the rear and below the shaft 25. The flouring devices 23 and 24 are adapted to flour the holder 30, the fingers 28 and the reciprocating cup 34. The chain 14 carrying the trays 17 extends forwardly from the chamber 21, and is adapted to pass the trays below the reciprocating cup 34. The reciprocating cup has two compartments formed in it, which receive lumps of dough in alternate sequence from the fingers 28. These compartments are shown at 35 and 36. The base 37, supporting the lower forward end of the casing 11, and supporting the frame 22, also supports a bracket 38 having an arm 39, secured to the forward wall 40 of the casing. The bracket 38 revolubly supports the shaft 41 carrying sprocket 42, about which the chain 14 extends. A guard plate 43 carries a plate 44 of a size substantially co-extensive with the lower end of the compartments in the reciprocating cup 34. The chain 14 is disposed substantially central to the plate 44, and the plate is in substantial alignment with the fingers 28. The cup 34 is reciprocated transversely to the plate 44 and when either of the compartments of the cup is disposed above the plate 44, the plate 44 forms a closure for the bottom of the compartment. The lateral movement of the cup then causes the walls of the compartment containing a lump of dough to carry said dough beyond the edge of the plate 44, whereupon the dough falls into one of the trays 20, which at that time is disposed below the edge of the plate. The cup 34 is reciprocated by a mechanism carried by the frame 22. A bracket 45 carries the cup 34, and is mounted on the frame 22 for transverse reciprocation. Movement is imparted to the bracket from a bell crank lever 46 pivotally mounted at 47 upon the frame 22, and having its one arm pivotally mounted at one end of a connecting rod 48, the other end of which rod is eccentrically mounted upon the gear 49 mounted on the shaft 25. The flour dusting mechanisms 23 and 24 are driven from the gear 49 by any suitable means such as a gear 50, and suitable actuating means 51. A curved bar 52, in the nature of a spring bar has it lower edge secured to the base 37, and is adapted to be engaged by the lugs on the trays 17, to preclude swinging of such trays upon their pivotal mountings. An idler gear 53 is adjustable alternately about the shaft 25, to provide tension means for the chain 26, through which motion is transmitted to the revolving fingers, see Fig. 2. The trays carrying dough are moved upwardly upon the chain, and into the chamber 21, following which the trays are moved vertically through the proofing chamber 12. At the rear end of the proofing chamber 12, the trays move about a sprocket 54 from whence they move horizontally about a sprocket 55, which is carried by the casing 11, emerging from the chamber 12, and passing forwardly beneath the casing. The conveyor is suitably supported by means of suspended sprockets beneath the casing 11. As the trays move forwardly below the casing 11, they engage the discharge mechanism indicated generally as 56. In course of the discharge of the trays, the trays 17 are inverted, and are moved along in an inverted position so that the dough may readily separate itself from the trays, and will be discharged upon suitable belts 57. The discharge mechanism, not forming a part of this invention, will not be described in length.

In operation, dough is received in the holder 30 from a holder or the like, and is transmitted from the holder 30, by means of the transfer fingers 28 to one of the compartments in the cup 34. The cup is moved laterally, by the reciprocating action of the bell crank lever 46 driven by means of the rod 48 from the gear 49, as described above, and the dough in said compartment is caused to be moved by the walls of said compartment to the edge of the plate 44 from which it drops into one of the trays 20 on one side of the chain 14. When one compartment in the cup 34 is moved to a discharge position, the other compartment is moved to a receiving position, and the latter compartment receives the next lump of dough from the fingers 28. When the cup is moved in the opposite direction, the second lump of dough is discharged into the next tray 20 on the opposite side of the chain 14. The loading mechanism, and the gearing is so timed, that the receiving and discharge of the compartments 35 and 36 is synchronized with the movement of the trays 17 so that one of the trays 17 will be disposed adjacent the plate 44, after one of the compartments in the cup 34 discharges a lump of dough, and after the cup 34, having received a lump of dough from the fingers 28 in the other compartment returns a second tray on the opposite side of the chain will come into alignment with said second compartment at the time such compartment discharges its lumps of dough.

What I claim is:

1. In a device of the class described the combination with a chain and trays carried by the chain on opposite sides thereof in staggered relation, of means for distributing articles to the trays comprising a reciprocating cup, for discharging alternately in trays on opposite sides of the chain, means for reciprocating the cup, and means for directing articles into the cup.

2. In a device of the class described the combination with a chain and trays carried by the opposite sides of the chain in staggered relation, of means for distributing articles to the trays and comprising a reciprocating cup having compartments therein, the compartments being open at their tops and bottoms, a plate extending over the chain and forming a closure for the bottom of each of the compartments, means for reciprocating the cup for closing the bottoms of the compartments in alternate sequence, and means for directing articles to the compartments when the bottoms thereof are closed.

3. In a device of the class described the combination with a chain and trays carried by the opposite sides of the chain in staggered relation, of means for distributing articles to the trays and comprising a reciprocating cup having compartments therein, the compartments being open at their tops and bottoms, a plate extending over the chain and forming a closure for the bottom of each of the compartments, means for reciprocating the cup for closing the bottoms of the compartments in alternate sequence, and means aligned with the plate for directing articles to the plate, the parts being so related that succeeding articles directed upon the plate are received by the compartments in alternate sequence.

4. In a device of the class described the combination with a chain and trays carried by the chain in staggered relation, of a slotted holder for receiving articles, a plate mounted in alignment with the holder, a cup having compartments therein, the compartments being open at their tops and bottoms, means for reciprocating the cup over the plate whereby the plate alternately forms a closure for the bottom of the compartments, fingers operating thru the slots in the holder for lifting articles from the holder and directing them onto the plate within one of the compartments in the cup and means for bringing a tray in alignment with the plate when said compartment is reciprocated from a position over the plate to a position over said tray for moving the article from the plate to the tray.

5. In a device of the class described the combination with a conveyor chain and trays carried by the chain on opposite sides thereof and in staggered relation, of a plate mounted above the chain and intermediate the trays, a cup having compartments therein, the compartments being open at their tops and bottoms, means for reciprocating the cup over the plate whereby each compartment may be alternately positioned over the plate and at one side thereof above one of the trays, a holder for articles to be handled by the conveyor and means for moving said articles from said holder to one of the compartments over the plate, the reciprocation of the cup serving to move said articles from the compartment and plate to one of the trays.

6. In a device of the class described the combination with a conveyor having trays carried in spaced staggered relation, of a plate mounted above the conveyor and intermediate the spaced trays, a cup having compartments therein, the compartments being open at their tops and bottoms, means for reciprocating the cup for alternately moving each compartment to a position over the plate and to a position adjacent the side of the plate, means comprising chains and sprockets for bringing a tray into vertical alignment with each compartment when said compartment is in a position adjacent the side of the plate and means for loading articles into the other compartment when said first mentioned compartment is in said position over the tray.

7. In a device of the class described the combination with a conveyor, of means for placing articles on the conveyor in staggered relation, said placing means comprising a reciprocating cup mounted for movement transversely of the normal line of movement of the conveyor and for discharging at substantially its opposite limits of reciprocation, means for reciprocating the cup, and means for depositing articles into the cup.

8. In a device of the class described the combination with a conveyor, of a cup reciprocally mounted over the conveyor, means for reciprocating the cup transversely of the normal line of movement of the conveyor, the cup having a pair of ways therethrough, a plate disposed over the conveyor and substantially centrally of the line of reciprocation of the cup, the plate alternately forming a closure for the bottoms of the individual ways of the cup, and means for discharging articles into the ways when disposed above the plate.

In testimony whereof, I have hereunto subscribed my name this 13 day of May, 1924.

WILLIAM G. KIRCHHOFF.